(12) United States Patent
Verwillegen

(10) Patent No.: US 9,717,367 B2
(45) Date of Patent: Aug. 1, 2017

(54) VACUUM FLASK ASSEMBLY

(71) Applicant: KONINKLIJKE PHILIPS N.V., Eindhoven (NL)

(72) Inventor: Marc Leendert Verwillegen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/427,188

(22) PCT Filed: Jan. 9, 2014

(86) PCT No.: PCT/EP2014/050253
§ 371 (c)(1),
(2) Date: Mar. 10, 2015

(87) PCT Pub. No.: WO2014/114493
PCT Pub. Date: Jul. 31, 2014

(65) Prior Publication Data
US 2015/0366404 A1    Dec. 24, 2015

Related U.S. Application Data

(60) Provisional application No. 61/756,026, filed on Jan. 24, 2013.

(30) Foreign Application Priority Data

Jan. 24, 2013  (EP) .................................... 13152488

(51) Int. Cl.
*A47J 39/00*     (2006.01)
*A47J 41/02*     (2006.01)
(Continued)

(52) U.S. Cl.
CPC ............... *A47J 41/02* (2013.01); *A47J 41/00* (2013.01); *A47J 41/0027* (2013.01); *A47J 41/0066* (2013.01); *B65D 43/26* (2013.01)

(58) Field of Classification Search
CPC ............... A47J 41/0027; A47J 41/0016; A47J 41/0083; A47J 41/0005; A47J 41/0022
See application file for complete search history.

(56) References Cited

U.S. PATENT DOCUMENTS 4,241,839 A  *  12/1980  Alberghini ........... B65D 23/001
                                                            215/12.1
4,353,473 A      10/1982  Morris
(Continued)

FOREIGN PATENT DOCUMENTS

GB    1463984 A    2/1977
JP    04115165 U   10/1992
(Continued)

OTHER PUBLICATIONS www.alibaba.com/showroom/push-button-vacuum-bottle.html, dated Dec. 22, 2012.
(Continued)

*Primary Examiner* — Jeffrey Allen

(57) ABSTRACT

The present application relates to a vacuum flask assembly (1). The vacuum flask assembly (1) comprises a vacuum flask (2) with a push-button lid (5). The push-button lid (5) is movable between an open condition and a closed condition, in which a sealing actuator (15) of the lid (5) is elevated when the lid (5) is in its open condition and retracted when the lid (5) is in its closed condition. The vacuum flask assembly (1) further comprises a container part (21) which is locatable over the lid (5) and is mountable to the vacuum flask (2). When the lid (5) is in its open condition, the container part (21) is configured to act on the sealing actuator (15) as the container part (21) is mounted to the (Continued)

vacuum flask (2), so that the lid (5) is urged to move from its open condition into its closed condition. The present application also relates to a container (3) for a vacuum flask (2) and a baby bottle kit.

10 Claims, 3 Drawing Sheets

(51) Int. Cl.
    *A47J 41/00*     (2006.01)
    *B65D 43/26*     (2006.01)

(56) References Cited

U.S. PATENT DOCUMENTS

| | | | |
|---|---|---|---|
| 4,960,218 A * | 10/1990 | Toida | A47J 41/0027 215/311 |
| 5,282,541 A | 2/1994 | Chen | |
| 5,427,271 A | 6/1995 | Wang | |
| 5,435,470 A | 7/1995 | Kim | |
| 5,547,111 A | 8/1996 | Geiger | |
| 5,842,612 A | 12/1998 | Won | |
| 5,944,235 A | 8/1999 | Won | |
| 2011/0132781 A1* | 6/2011 | Willat | B65D 1/0276 206/217 |

FOREIGN PATENT DOCUMENTS

| | | |
|---|---|---|
| JP | 10337523 A | 12/1998 |
| JP | 2002087447 A | 3/2002 |
| JP | 2005335799 A | 12/2005 |
| JP | 2009067409 A | 4/2009 |
| JP | 2011126584 A | 6/2011 |

OTHER PUBLICATIONS www.amazon.co.uk/Sagaform-Vacuum-Flask-Large-Mub/dp/B000SLZ9TI, dated Dec. 22, 2012.
www.ebay.com/itm/Thermos-Red-Plastic-Push-Button-Top-Vint-Taiwan-EXLNT-/180782599601, dated Dec. 24, 2012.
www.dooyoo.co.uk/kids-equipment/tommee-tippee-closer-to-nature-travel-bottle-warmer/1665940/, dated Jan. 8, 2013.

* cited by examiner

VACUUM FLASK ASSEMBLY

This application is the U.S. National Phase application under 35 U.S.C. §371 of International Application No. PCT/EP2014/050253, filed on Jan. 9, 2014, which claims the benefit of U.S. Provisional Application No. 61/756,026 filed on Jan. 24, 2013 and International Application EP13152488.6 filed Jan. 24, 2013. These applications are hereby incorporated by reference herein.

FIELD OF THE INVENTION

The present application relates to a vacuum flask assembly. The present application also relates to a container for a vacuum flask and a baby bottle kit.

BACKGROUND OF THE INVENTION

With babies and small infants it is necessary to provide milk, such as expressed or formula milk, or other liquids, at a predetermined temperature above room temperature. Such milk is generally heated in a baby bottle or the like before being fed to a baby. Whilst it is relatively simple to heat the contents of a baby bottle at home, it can be difficult to find the facilities to heat contents of a baby bottle in other circumstances.

One way of preparing the contents of a baby bottle is to submerge at least part of a baby bottle containing the liquid in hot water. Therefore, it is known to transport hot water in a vacuum flask, also known as a Thermos™. Vacuum flasks are able to retain water or another liquid received in the flask at a temperature above the surrounding temperature for a sustained period of time. This water may then be poured into a container in which a baby bottle is placed to heat the contents of the baby bottle when desired.

Vacuum flasks generally have a lid which is removable to allow liquid to be fed into the flask and is openable to allow liquid to be poured from the flask. However, it has been recognised that it is easily forgotten to close the vacuum flask after use. This is particularly acute when the vacuum flask has a lid which is openable and closable without having to remove the lid because it may be difficult to immediately recognise whether a lid is sealed or unsealed. It is not easy to stay calm and focus on safely storing the flask containing a hot liquid, when a baby is crying or when a large number of items have to be packed. A user may forget to close the fluid passageway, causing unwanted spill of liquid, which may result in wet items and burns.

SUMMARY OF THE INVENTION

It is an object of the invention to provide a vacuum flask assembly, a container for a vacuum flask and/or a baby bottle kit which substantially alleviates or overcomes the problems mentioned above, amongst others.

According to the present invention, there is provided a vacuum flask assembly comprising a vacuum flask with a push-button lid, the push-button lid being movable between an open condition and a closed condition, in which a sealing actuator of the lid is elevated when the lid is in its open condition and retracted when the lid is in its closed condition, and the vacuum flask assembly further comprising a container part which is locatable over the lid and mountable to the vacuum flask wherein, when the lid is in its open condition, the container part is configured to act on the sealing actuator as the container part is mounted to the vacuum flask, so that the lid is urged to move from its open condition into its closed condition.

The above arrangement means that the lid is inevitably moved into its closed position when the container part is mounted to the vacuum flask. This ensures that the lid is not accidentally left in an open condition when the vacuum flask assembly is assembled. Therefore, hot liquid is prevented from flowing from the flask when the vacuum flask assembly is assembled, and so provides an inherently safe design.

The container part may comprise a biasing surface configured to act on the sealing actuator when the container part is mounted to the vacuum flask. The biasing surface may be an inner surface of the container part.

This provides a simple arrangement for urging the sealing actuator into its retracted position.

The vacuum flask assembly may further comprise a base, wherein the container part mounts to the base.

The base may be disposed at an opposing end of the vacuum flask to the lid and the container part may extend over the vacuum flask to mount to the base.

Therefore, it is possible for the lid to act as a container part for receiving a hot liquid when the container part is removed from the vacuum flask.

The base may be separable from the vacuum flask.

This means that the vacuum flask may be disassembled for individual use, and enables easy cleaning. Furthermore, ease of manufacture is maximised.

The base may be attachable to the vacuum flask.

The vacuum flask may further comprise a vessel, and the base may be configured to receive an end of vessel.

The container part may be configured to extend substantially along the vacuum flask.

The container part may be configured to act on the sealing actuator prior to the container part reaching a mounted position.

Therefore, the lid is urged into a closed condition even if the container part is not fully in its mounted position. With this arrangement, the safety of the container and vacuum flask are enhanced because it is not necessary for the container to be fully closed to prevent hot water flowing out of the flask.

The container part may be configured to receive a baby bottle.

Therefore, it is possible to receive a baby bottle in the container part together with a hot liquid poured from the vacuum flask to heat the contents of the baby bottle. According to another aspect of the invention, there is provided a container for receiving a vacuum flask with a vessel and a push-button lid, the push-button lid being movable between an open condition and a closed condition, in which a sealing actuator of the lid is elevated when the lid is in its open condition and retracted when the lid is in its closed condition, the container comprising a first container part and a second container part which are mountable to each other to enclose a vacuum flask, and wherein the first container part is configured to locate against the vessel of a vacuum flask, and the second container part is configured to act on the sealing actuator when the lid is in its open condition and the first and second container parts are mounted to each other to enclose a vacuum flask, so that the lid is urged to move from its open condition into its closed condition.

This means that the lid is inevitably moved into its closed position when the vacuum flask is enclosed by the container. This ensures that the lid of the vacuum flask is not accidentally left in an open condition when the vacuum flask assembly is assembled. Therefore, hot liquid is prevented from flowing from the flask when the vacuum flask assembly is assembled, and so provides an inherently safe design. Furthermore, it is possible to remove the container from the vacuum flask for ease of cleaning.

The first container part may be a base configured to locate against an opposing end of a vacuum flask to the lid. The second container part may be a cap configured to receive the lid and at least part of the vessel of a vacuum flask.

The cap may be configured to extend along the vessel of a vacuum flask to mount to the base.

Therefore, it is possible for the lid to act as a container part for receiving a hot liquid when the container part is removed from the vacuum flask.

The cap may be configured to receive a baby bottle when a vacuum flask is not received therein.

Therefore, it is possible to receive a baby bottle in the cap together with a hot liquid poured from the vacuum flask to heat the contents of the baby bottle.

The first container part may be threadingly engagable with the second container part.

Therefore the first container part is easily mounted to the second container part.

According to another aspect of the invention, there is provided a baby bottle kit comprising a container according to any of claims 1 to 8 or a vacuum flask assembly according to any of 1 to 10, and a baby bottle, wherein the container part is configured to receive the baby bottle.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
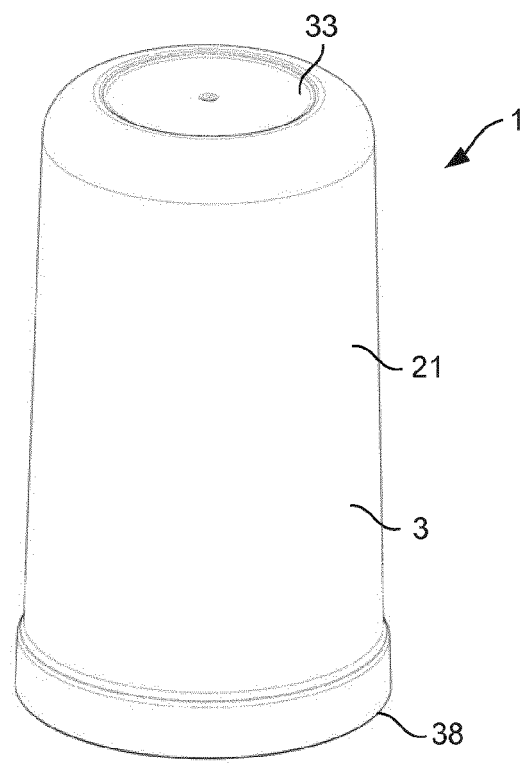
FIG. 1 shows a perspective view of a vacuum flask assembly with a vacuum flask and a container in a partially disassembled state.
Figure 1:
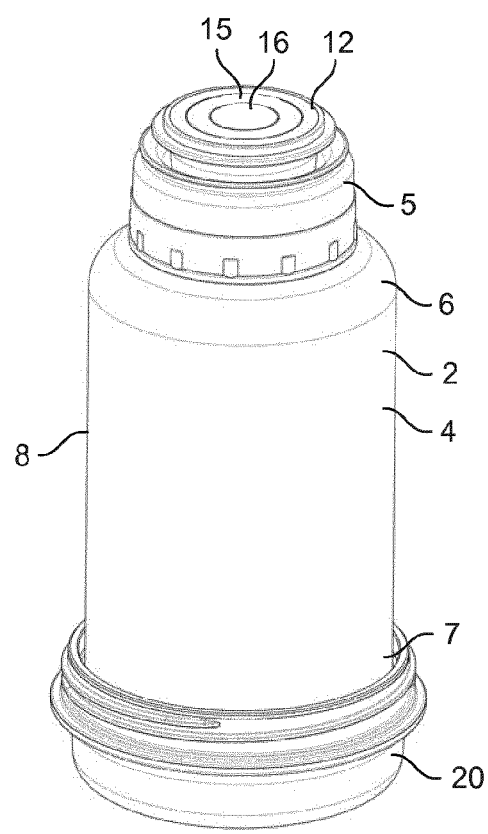

FIG. 1 shows a vacuum flask assembly 1 in a partially disassembled state. The vacuum flask assembly 1 comprises a vacuum flask 2 and a container 3. The container 3 is configured to receive the vacuum flask 2 therein.

The vacuum flask 2, also known as a Thermos™ or Dewar flask, is an insulated vessel for storing liquid. The vacuum flask 2 has two layers (not shown) which are spaced from each other by a gap which is partially evacuated of air to create a near-vacuum to restrict heat transfer, such as conduction or convection. The vacuum flask 2 is configured to maintain a liquid received therein at a temperature higher than the temperature of the surroundings. It will also be understood that the vacuum flask 2 may be used to maintain a liquid received therein at a temperature lower than the temperature of the surroundings. In the present arrangement, the vacuum flask 2 is intended to retain hot water for use in heating up the contents of a baby bottle.

Referring to FIGS. 2 to 5, the vacuum flask 2 comprises a storage vessel 4 and a lid 5. The storage vessel 4 is elongate with top and bottom ends 6, 7. The storage vessel 4 is cylindrical with a side wall 8 extending therearound. A bottom face 9 is formed at the bottom end 7. The bottom face 9 may be indented, but defines a plane from which the vacuum flask 2 upstands when disposed on a planar surface (not shown). The edge between the side wall 8 and the bottom wall 9 is chamfered.

A neck (not shown) is formed at the top end 6 of the storage vessel 4. The neck has a screw thread formed on a cylindrical outer face (not shown) for threadingly engaging the lid 5 to the storage vessel 4. The neck also forms an opening (not shown) through which a liquid is able to be poured into or from the storage vessel 4.

The lid 5 engages with the neck of the storage vessel 4. The lid extends over the opening (not shown) of the storage vessel 4 to control the flow of liquid into and from the storage vessel 3. The lid 5 is separable from the storage vessel 4 to allow liquid to be easily poured into the storage vessel 4. Once a liquid has been poured into the storage vessel 4, the lid 5 is mounted to the storage vessel 4, over the opening. A seal is formed between the lip of the opening and the lid 5. The lid 5 is mounted to, and extends from, the top end 6 of the storage vessel 4. That is, the lid 5 defines the top end of the vacuum flask 2.

A screw thread 10 is formed at the bottom end 7 of the storage vessel 4. The screw thread 10 extends around the side wall 8 of the storage vessel 4 proximate to the bottom face 9.

The lid 5 has an upper face 12. The lid 5 also has a substantially cylindrical side face 13. The upper face 12 of the lid 5 defines a top plane of the vacuum flask 2. The upper face 12 of the lid 5 extends parallel to, but spaced from, the bottom face 9 of the storage vessel 4 when the vacuum flask 2 is assembled.

The height of the vacuum flask 2 is defined by the combined height of the storage vessel 4 and the lid 5 when the storage vessel 4 and lid 5 are assembled, i.e. the lid 5 is mounted to the storage vessel 4. That is, the height of the vacuum flask 2 is defined by the distance between the plane of the bottom face 9 of the storage vessel 4 and the plane of the upper face 12 of the lid 5 when the vacuum flask 2 is assembled.

The lid 5 has a valve (not shown) acting as a liquid flow control unit. The valve allows a flow of liquid through the lid 5. The valve in the lid 5 controls the flow of liquid through a fluid passageway (not shown) formed in the lid 5. When the lid 5 is mounted to the storage vessel 4, the fluid passageway communicates inside the storage vessel 4 with outside the storage vessel 4.

The valve is operable to change the lid from a closed condition and an open condition, thereby opening and closing the fluid passageway from the inside of the vacuum flask to the outside of the vacuum flask. When the lid 5 is in a closed condition, the valve is sealed to prevent the flow of liquid through the fluid passageway. That is, liquid is prevented from flowing through the lid 5. When the lid 5 is in an open condition, the valve is unsealed to allow the flow of liquid through the fluid passageway. That is, liquid is allowed to flow through the lid 5.

A sealing push-button 15, acting as a sealing actuator, seals the valve so that liquid is prevented from flowing through the lid 5. That is, the sealing push-button 15 actuates the lid 5 to move from its open condition into its closed condition. An unsealing push-button 16, acting as an unsealing actuator, unseals the valve so that liquid can flow through the lid 5. That is, the unsealing push-button 16 moves the lid 5 from its closed condition into its open condition.

Figure 2:
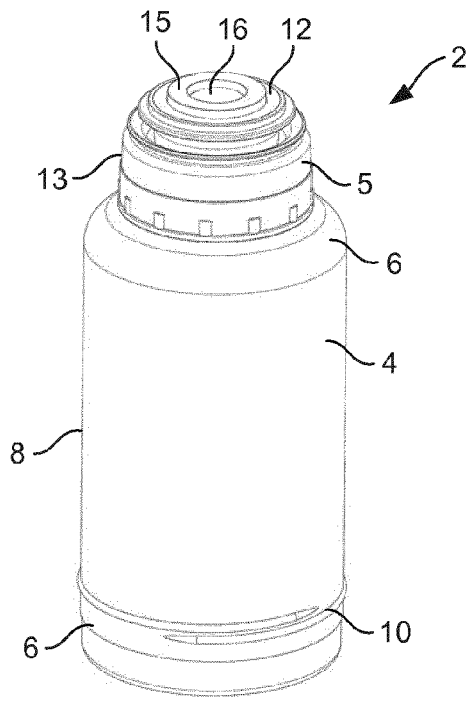
FIG. 2 shows a perspective view of the vacuum flask shown in FIG. 1 with a lid in an open condition.
Figure 3:
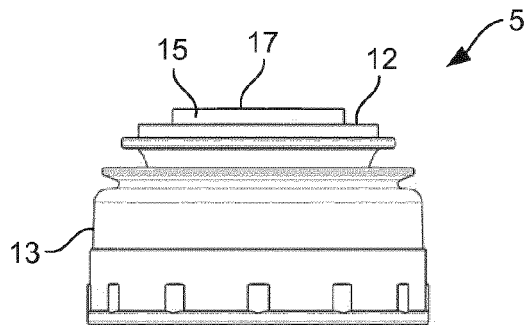
FIG. 3 shows a side view of the lid of the vacuum flask shown in FIG. 1 in its open condition.

In FIGS. 2 and 3, the lid 5 is shown in its open condition. In this open condition the sealing push-button 15 protrudes from the upper face 12 of the lid 5. That is, an upper surface 17 of the sealing push-button 15 is spaced from the upper face 12 of the lid 5. The unsealing push button 16 extends parallel to, or is recessed from, the upper face 12 of the lid 5 when the lid 5 is in its open condition. That is, an upper surface 18 of the unsealing push-button 15 extends parallel to, or is recessed from, the upper face 12 of the lid 5. With this arrangement, the upper surface 17 of the sealing push-button 15 protrudes further from the lid 5 than the upper surface 18 of the unsealing push-button 15.

Figure 4:
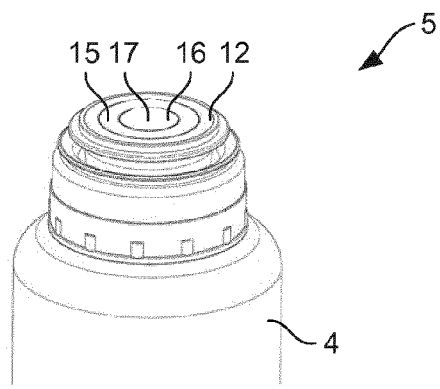
FIG. 4 shows a perspective view of the vacuum flask shown in FIG. 1 with the lid in a closed condition.
Figure 5:
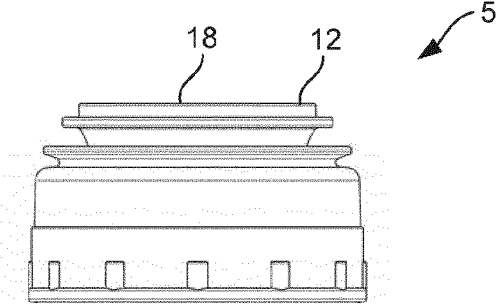
FIG. 5 shows a side view of the lid of the vacuum flask shown in FIG. 1 in its closed condition.
Figure 6:
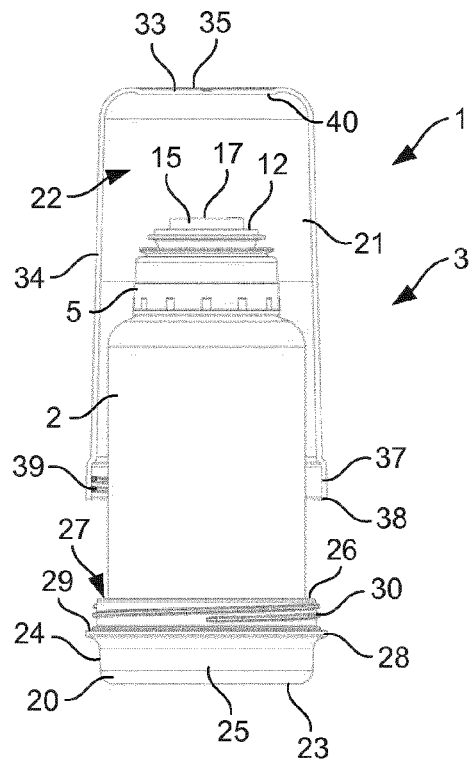
FIG. 6 shows a side view of the vacuum flask assembly shown in FIG. 1 with a cap of the container shown in cross section and partially received over the vacuum flask.
Figure 7:
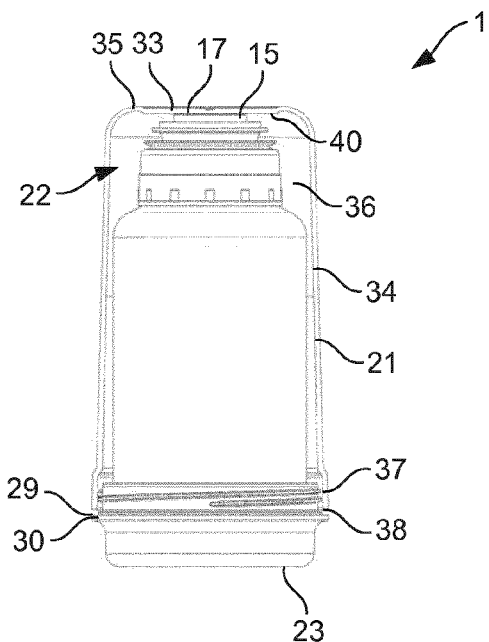
FIG. 7 shows a side view of the vacuum flask assembly shown in FIG. 1 with the cap shown in cross section and received over the vacuum flask.
Figure 8:
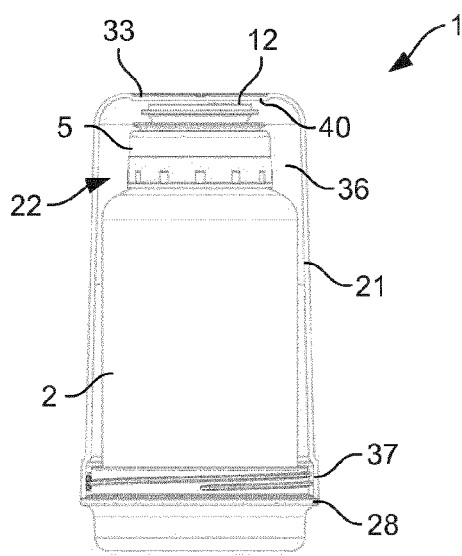
FIG. 8 shows a side view of the vacuum flask assembly shown in FIG. 1 in an assembled state with the cap shown in cross section and in a mounted position.
Figure 9:
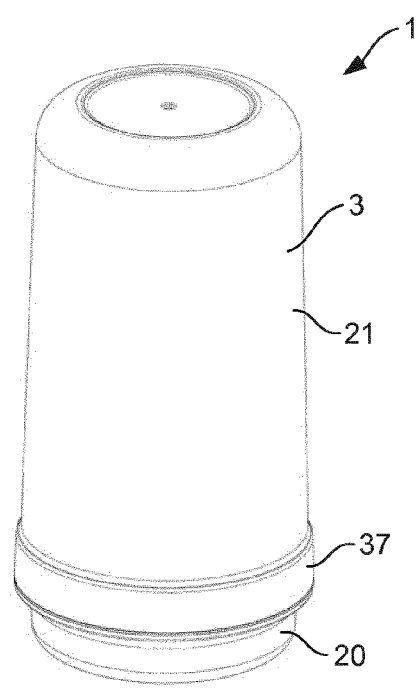
FIG. 9 shows a perspective view of the vacuum flask assembly shown in FIG. 1 in an assembled state.

In FIGS. 4 and 5, the lid 5 is shown in its closed condition. In this closed condition the sealing push-button 15 extends parallel to, or is recessed from, the upper face 12 of the lid 5. That is, the upper surface 17 of the sealing push-button 15 is parallel to, or is recessed from, the upper face 12 of the lid 5. The unsealing push button 16 extends parallel to, or is recessed from, the upper face 12 of the lid 5 when the lid 5 is in its closed condition. That is, the upper surface 18 of the unsealing push-button 15 extends parallel to, or is recessed from, the upper face 12 of the lid 5.

The sealing push-button 15 protrudes further from the lid 5 when the lid 5 is in its open condition than when it is in its closed condition. The distance between the upper surface 17 of the sealing push-button 15 and the upper face 12 of the lid 5 is greater when the lid 5 is in its open condition compared to when it is in its closed condition.

The sealing push-button 15 is depressed to operate the valve to move the lid 5 from its open condition into its closed condition.

The unsealing push-button 16 is depressed to operate the valve to move the lid 5 from its closed condition into its open condition. When the valve is operated to move the lid 5 from its closed condition into its open condition the sealing push-button 15 is urged to move outwardly to extend from the lid 5. When the lid 5 is in its closed condition, the sealing button 15 is in a refracted position. When the lid 5 is in its open condition, the sealing button 15 is in a protruding position.

In the present embodiment, the unsealing push-button 16 is formed in the centre of the upper face 12 of the lid 5. The sealing push-button 15 extends around the unsealing push-button 16. However, it will be understood that the arrangement of the sealing and unsealing push-buttons 15, 16 may vary.

In the above arrangement separate push-buttons are used to move the lid from an closed position into an open condition, that is to unseal the lid so that liquid is able to flow through the lid, and to move the lid from an open position into a closed position, that is to seal the lid so that liquid is prevented from flowing through the lid. However, it will be understood that in an alternative arrangement a single push button (not shown) may be used. In such an arrangement, the push button is in a protruding position when the lid is in its open condition. The lid moves into its closed condition when the push button is urged to move towards the upper face of the lid, that is the push button protrudes to a lesser extent from the upper face of the lid.

Referring to FIGS. 6 to 9, the container 3 comprises a base 20 and a cap 21. The base 20 acts as a container part. The cap 21 acts as another container part. The container 3 defines a container receiving chamber 22. The base 20 and cap 21 are configured to be brought together to define the container receiving chamber 22.

In the present arrangement, the base 20 is cup-shaped. The base 20 has a base wall 23, and a base side wall 24. An outer surface 25 of the base wall 24 is planar. This enables the container 3 to be supported on and upstand from a planar surface, such as a table. The base side wall 24 upstands from the base wall 23 and extends around the periphery of the base wall 23. The base side wall 24 has an upper rim 26.

The base 20 defines a first portion 27 of the container receiving chamber 22. That is, the base 20 is configured to receive part of the vacuum flask 2. In the present arrangement, the base 20 is configured to receive the bottom end 7 of the storage vessel 4.

A screw thread (not shown) is formed on the inner surface of the base side wall 24. The screw thread on the inner surface of the base side wall 24 is configured to engage with the screw thread 10 formed at the bottom end 7 of the storage vessel 4. Therefore, the base 20 is attachable to the vacuum flask 2. Although in the present embodiment, the base 20 is attachable to the vacuum flask through a threaded engagement, it will be understood that alternative attachment means may be used.

A shoulder 28 extends circumferentially around the base side wall 23. The shoulder 28 defines an abutment surface 29, as will become apparent hereinafter. The abutment surface 29 is an upper surface of the shoulder 28 and extends parallel, but spaced from, the upper rim 26 of the base side wall 24.

A helical thread 30, acting as a first engagement element, is formed on the base 20. The helical thread 30 is formed on an outer surface of the base side wall 24. The helical thread 30 is formed between the upper rim 26 and the abutment surface 29 of the shoulder 28.

The base wall 23 has an inner surface. The inner surface forms a locating surface against which the bottom face 9 of the storage vessel 4 locates when the bottom end 7 of the storage vessel 4 is received in the base 20. In an alternative arrangement the locating surface is formed by one or more locating elements upstanding from the inner surface of the base wall 23 or extending inwardly from the base side wall 24.

The cap 21 is cup-shaped. The cap 21 is configured to receive and retain liquid, such as hot water, therein. The cap 21 has an upper wall 33 and a cap side wall 34. An outer surface 35 of the cap upper wall 33 is planar. This enables the cap 21 to be supported on and upstand from a planar surface, such as a table. The cap side wall 34 upstands from the cap upper wall 33 and extends around the periphery of the cap side wall 34.

The cap 21 defines a second portion 36 of the container receiving chamber 22. That is, the cap 21 is configured to receive part of the vacuum flask 2. In the present arrangement, the cap 21 is configured to receive the lid 5 and the top end 6 of the storage vessel 4.

The cap side wall 34 has a collar 37 at its free end. The collar 37 extends circumferentially around the cap side wall 34. The collar 37 defines a rim 38 of the cap 21. The collar 37 forms a step in the cap side wall 34. That is, the diameter of the collar 36 is greater than the diameter of the remainder of the cap side wall 34.

A helical thread 39, acting as a second engagement element, is formed on the cap 21. The helical thread 39 is formed on an inner surface of the collar 36. The helical thread 39 is formed between the step and the rim 38 of the cap 21.

The upper wall 33 of the cap has an inner surface. The inner surface forms a biasing surface 40 against which the sealing push-button locates when the bottom end 7 of the storage vessel 4 is received in the base 20. In an alternative arrangement the biasing surface is formed by one or more biasing elements upstanding from the inner surface of the upper wall 33 of the cap 21 or extending inwardly from the cap side wall 34.

The cap 21 is configured to receive a baby bottle therein. It will be understood that the dimensions of a baby bottle may vary, but will typically be within certain dimensions.

The container 3 is formed from a heat-resistant material, such as a heat-resistant plastic. The cap 21 may be translucent to allow the depth of the water in the cap 21 to be easily determined when water is poured into the cap 21.

To use the vacuum flask assembly 1, the lid 5 is removed from the storage vessel 4 so that a hot liquid, such as hot water, can be poured in. The lid 5 is then attached to the storage vessel 4, and a seal is formed between the storage vessel 4 and the lid 5. When the lid 5 is in its closed condition, the vacuum flask 2 is sealed and the hot water is prevented from flowing out of the vacuum flask 2. The vacuum flask 2 is then able to maintain the liquid received therein at a temperature higher than the temperature of the surroundings.

The container 3 is initially separate from the vacuum flask 2. The bottom end 7 of the storage vessel 4 is inserted into the base 21 of the container 3. The base 21 is configured to receive the bottom end 7. The storage vessel 4 is inserted into the vacuum flask 2 until the bottom face 9 of the storage vessel 4 locates against the locating surface of the base wall 23. This acts to position and locate the base 21 on the vacuum flask 2.

The base 21 is attached to the storage vessel 4 of the vacuum flask 2 due to the screw threads on the inner surface of the base side wall 24 and the outer surface 8 of the storage vessel 4. Therefore, the base 21 is fixedly attached to the vacuum flask 2 in a desired position.

The cap 21 is then received over the other end of the vacuum flask 2. That is, the cap 21 is received over the lid 5 and the top end 6 of the storage vessel 4. The cap side wall 34 locates along the vacuum flask 2, such that the cap 21 overlaps the base 20.

The collar 37 of the cap 21 locates over the upper rim 26 of the base 20. The cap 21 mounts to the base 20. With the present arrangement, the helical thread 39 of the cap 21 threadingly engages with the helical thread 30 of the base 20. The cap 21 moved towards the base 20 until the cap 21 abuts against the shoulder 29 of the base 20. Therefore the shoulder 29 acts as an end stop. With this arrangement, the rim 38 of the cap 21 locates against the abutment surface 29 of the shoulder 29. Alternatively, it will be understood that the step of the collar 37 may act as the end stop.

At this stage, the cap 21 is mounted to the base 20 with the vacuum flask 2 received therebetween. Therefore, the cap 21 is mounted to the vacuum flask 2 due to the vacuum flask 2 being received in the vacuum flask receiving chamber 22. The bottom face 9 of the storage vessel 4 locates against the locating surface of the base wall 23 and the upper face 12 of the lid 12 locates against or proximate to the biasing surface of the cap 21. The distance between the locating surface of the base wall 23 and the biasing surface 40 of the cap 21 when the container 3 is assembled corresponds to the height of the vacuum flask 2 between the plane of the bottom face 9 of the storage vessel 4 and the plane of the upper face 12 of the lid 5.

When the lid 5 is in its closed condition, the sealing push-button 15, acting as the sealing actuator, is in its retracted position. Therefore, the biasing surface 40 of the lid is not urged against the sealing push-button 15 as the cap 21 is mounted to the base 20 when the lid 5 is in its closed condition.

To use the vacuum flask assembly, the cap 21 is dismounted from the base 20 and removed from the vacuum flask 2. The cap 21 is then inverted so that the upper wall 33 of the cap 21 is positionable on a surface, such as a table. The unsealing push-button 16 is then depressed to move the lid 5 into its open condition. The hot water in the vacuum flask 2 is then able to be poured in the cap 21. A baby bottle (not shown), forming part of a baby bottle kit, is then placed in the cap 21 along with the hot water to heat the contents of the baby bottle to a desired temperature.

Once the baby bottle is at the desired temperature, it is then removed from the cap 21. The water in the cap 21 may then be discarded. Following this, the cap 21 may be replaced on the vacuum flask 2. The cap 21 is therefore received over the vacuum flask 2 and is mounted to the base 20 as described above.

In the event that the user has inadvertently failed to close the lid 5, that is the user has not depressed the sealing push-button 15 to move the lid 5 into its closed condition, then liquid is still able to flow through the lid and the sealing push-button 15 remains in its extended position as the cap 21 is received over the vacuum flask 2. However, as the cap 21 is mounted to the base 20, the biasing surface 40 of the cap 21, which in this arrangement is formed by the upper wall 33, abuts against the upper surface 17 of the sealing push-button 15. Therefore, the biasing surface 40 acts on the sealing push-button 15 and urges it to move into its retracted position. This means that the lid 5 is inevitably moved from its open condition to its closed condition as the cap 21 is mounted.

The lid 5 is prevented from being in its open condition when the container 21 is assembled over the vacuum flask 2. Therefore, the vacuum flask assembly 1 provides an inherently safe design to prevent the spillage of liquid from the flask when the vacuum flask assembly 1 is assembled. When the cap 21 is subsequently removed the lid 5 remains in a closed condition until the unsealing push-button 16 is depressed.

Although in the above embodiments the base 20 is attachable to the vacuum flask 2, it will be understood that in an alternative arrangement the base 20 is not attachable to the vacuum flask 2.

Although in the above described embodiments the vacuum flask assembly comprises a container having a cap and a base which are configured to receive and enclose a vacuum flask, it will be understood that alternative arrangements are envisaged. In an alternative arrangement the vacuum flask assembly may comprise a vacuum flask and a cap with the cap being directly mountable to the vacuum flask. In such an arrangement the base is integrally formed with the storage vessel of the vacuum flask.

Although in the above embodiments the upper end of the base 20 is received in the collar of the cap 21, it will be understood that alternative arrangements are envisaged. For example, in an alternative arrangement a collar (not shown) is formed on the base 20, and the free end of the cap is received by the collar. In such an arrangement, the threaded part on the base 20 is formed on an inner surface, and the threaded part on the cap 21 is formed on an outer surface.

Although in the above embodiments the engagement means between the base 20 and cap 21 are formed by threaded engagement between the two container parts, it will be understood that alternative arrangements are envisaged. For example, in an alternative arrangement a click-lock arrangement is used, wherein one or more protrusions extend from a surface of one of the container parts which are received in a recess formed in the other container part. Alternatively, clasps or clips may be used to mount the base 20 and cap 21 to each other.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A vacuum flask assembly comprising:
    a vacuum flask comprising a push button-lid movable between an open condition and a closed condition,
    a container cap locatable over the push-button lid and mountable to the vacuum flask,
    the vacuum flask further comprising a storage vessel, the push-button lid extending over an opening of the storage vessel to control the flow of liquid from and into the storage vessel,
    a container base disposed at the opposing end of the vacuum flask to the push-button lid;
    the push-button lid being separable from the storage vessel and having a valve acting as a liquid flow control unit for controlling the flow of liquid through a fluid passageway formed in the push-button lid,
    the push-button lid comprising a sealing push-button acting as a sealing actuator for actuating the push-button lid to move from said open condition to said closed condition,
    the push-button lid comprising an unsealing push button acting as an unsealing actuator for actuating the push-button lid to move from said closed condition to said open condition,
    wherein when said push-button lid is in said open condition:
        the sealing push button is elevated above an upper face of the push-button lid, thereby allowing liquid to flow through the push-button lid,
        the unsealing push button is retracted, and extends either parallel to, or recessed from the upper face of the push-button lid, such that an upper surface of the sealing push button protrudes further from the lid than an upper surface of the unsealing push button,
    wherein when said push-button lid is in said closed condition:
        the sealing push button extends parallel to or is recessed from the upper face of the push-button lid,
        the unsealing push button extends parallel to, or is recessed from the upper face of the push-button lid,
    wherein, when the sealing actuator is in its open condition and the container cap is mounted to the container base, the container cap acts on the sealing actuator to move it into its closed condition, the container cap extending over the vacuum flask to mount to the container base.

2. A vacuum flask assembly according to claim 1, wherein the container cap comprises a biasing surface configured to act on the sealing actuator when the container cap is mounted to the vacuum flask.

3. A vacuum flask assembly according to claim 2, wherein the biasing surface is an inner surface of the container cap.

4. A vacuum flask assembly according to claim 1, wherein the container base is separable from the vacuum flask.

5. A vacuum flask assembly according to claim 4, wherein the container base is attachable to the vacuum flask.

6. A vacuum flask assembly according to claim 1, wherein the container cap is configured to extend substantially along the vacuum flask.

7. A vacuum flask assembly according to claim 1, wherein the container cap is configured to act on the sealing actuator prior to the container cap reaching a mounted position.

8. A vacuum flask assembly according to claim 1, wherein the container cap is configured to receive a baby bottle.

9. The vacuum flask assembly according to claim 1, further comprising: a neck formed at the top end of the storage vessel, the neck having a screw thread formed on a cylindrical outer face for threadingly engaging the push-button lid to the storage vessel, the neck forming an opening through which a liquid is able to be poured into or from the storage vessel.

10. The vacuum flask assembly according to claim 1, wherein when the push-button lid is mounted to the storage vessel, the fluid passageway communicates inside the storage vessel with outside the storage vessel, the valve being operable to change the push-button lid from said closed condition to said open condition, thereby opening and closing the fluid passageway from the inside of the vacuum flask to the outside of the vacuum flask.

* * * * *